United States Patent [19]

Nelson

[11] 4,440,359
[45] Apr. 3, 1984

[54] CASSETTE ROLLER GUIDE

[75] Inventor: Norman E. Nelson, Roseville, Minn.

[73] Assignee: Minnesota Mining and Manufacturing Company, St. Paul, Minn.

[21] Appl. No.: 360,348

[22] Filed: Mar. 22, 1982

[51] Int. Cl.³ .......................... G03B 1/04; G11B 15/32
[52] U.S. Cl. ..................................... 242/199; 226/190
[58] Field of Search ............... 226/189, 190, 194, 195, 226/198, 199; 242/197, 210, 55.19, 55.19 A; 360/93, 95, 132

[56] References Cited

U.S. PATENT DOCUMENTS 3,462,057  8/1969  Yamamoto ........................ 226/181
3,735,940  5/1973  Schwartz ........................... 242/199
3,829,040  8/1974  Nelson ............................... 242/199
3,837,599  9/1974  Souza ................................ 242/199
3,891,159  6/1975  Nelson ............................... 242/199

Primary Examiner—Leonard D. Christian
Attorney, Agent, or Firm—Donald M. Sell; James A. Smith; William L. Huebsch

[57] ABSTRACT

An improved magnetic tape roller guide assembly rotatably mounted between spaced sidewalls of a magnetic tape cassette. The guide includes a central hub having an integral biasing projection formed on an end surface by partially slicing the material comprising the hub. The projection bears against one sidewall to produce a biasing force locating the guide assembly between the sidewalls, thus preventing guide oscillation.

7 Claims, 3 Drawing Figures

CASSETTE ROLLER GUIDE

BACKGROUND OF THE INVENTION

1. Field of the Invention

The present invention relates in general to magnetic recording tape cassettes and more specifically to a rotatable tape roller guide for such cassettes.

2. Description of the Prior Art

Typical tape cassettes include a case with spaced apart sidewalls, at least one tape supporting reel rotatably disposed between the case sidewalls, and a pair of tape guiding members which are typically pin mounted in the case. Rotatable tape roller guides in tape cassettes are advantageous because they produce minimal drag on the tape and thereby reduce the torque required to advance the tape. However, in the past it has been a problem to efficiently and economically produce cassettes including rotatable guides having proper bearing end clearances. If too small a bearing end clearance is provided, the guides will bind in the case; if too large a bearing end clearance is provided, the guides will oscillate on their pin shafts and when driven at high speeds produce an irritating noise. A lowering of the quality of reproduction of the recorded format due to improper tape positioning as a result of such oscillation can also occur.

Attempts to provide the required case to roller guide clearance while limiting oscillation have been disclosed in U.S. Pat. No. 3,891,159, issued June 24, 1975 to Nelson, and U.S. Pat. No. 3,829,040 issued Aug. 13, 1974 to Nelson, both assigned to the assignee of the present invention, which show shim layers positioned within the cassette body which straddle the roller guides to prevent oscillation and a spindle press fitted into the roller guide bore and adjusted by contact with the case as the cassette case is assembled, respectively.

Another means for preventing guide oscillation was shown in U.S. Pat. No. 3,735,940 issued May 29, 1973 to Schwartz in which a roller is shown biased into contact with the cassette case by a coil spring.

Although these methods of preventing roller guide oscillation have proven to be operationally satisfactory, they result in undesirable manufacturing expense and assembly costs.

SUMMARY OF THE INVENTION

The present invention provides a rotatable roller guide for a magnetic tape cassette which includes a biasing projection as an integral part of the roller guide which prevents guide oscillation by continuously urging the guide toward one of two sidewalls of the cassette. Since separate elements to perform this function need not be provided, manufacturing and assembly costs are greatly reduced.

A roller guide according to the present invention comprises a cylindrical tape guide surface and a central hub having an end surface which includes an integral biasing projection formed by partially slicing the hub end surface. The projection is slightly deformed during assembly and material resiliency produces a biasing force which locates the guide with respect to the sidewalls and greatly restricts roller guide oscillation.

BRIEF DESCRIPTION OF THE DRAWING

The present invention will be further described with reference to the accompanying drawing wherein like numbers refer to like parts in the several views, and wherein.

DETAILED DESCRIPTION

Figure 1:
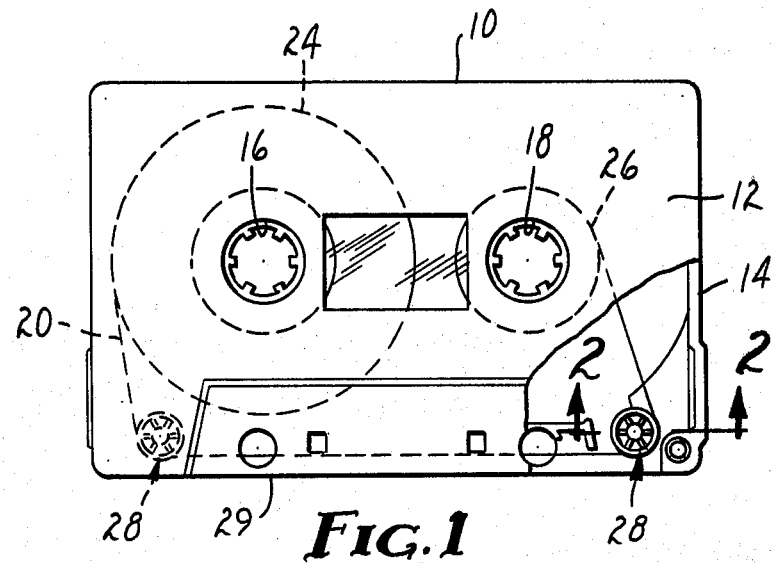
FIG. 1 is a plan view of a typical tape cassette including a pair of roller guides according to the present invention and having a part broken away to show details.

Referring now to the drawings and specifically to FIG. 1, there is shown a magnetic tape cassette including a case 10 which has a pair of shells or sidewalls 12 and 14 which mate with each other in a conventional manner to provide an interior space for receiving and rotatably mounting a pair of tape reels 16 and 18 on which end portions of a flexible magnetic tape 20 can be wound to form tape packs 24 and 26.

Located within the case 10 between the sidewalls 12 and 14 are roller guide assemblies 28 which serve to direct tape 20 coming off respective tape packs 24 or 26 so that the tape 20 extends along and is movable relative to an adjacent side margin 29 of the cassette case 10. The case margin 29 between the roller guide assemblies 28 is apertured to present several spaced openings by means of which portions of the magnetic tape 20 are exposed.

Figure 2:
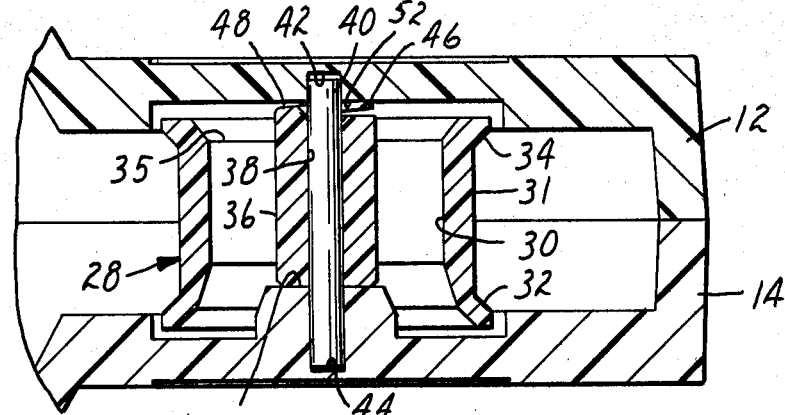
FIG. 2 is an enlarged fragmentary view in cross-section taken approximately through the plane 2—2 of FIG. 1, indicating the disposition of one of the roller guides of FIG. 1 in the cassette.

One of the two identical roller guide assemblies 28 is shown in FIG. 2, and is comprised of any suitable material, which may be metal but is preferably plastic, and has a rim 30 providing a cylindrical surface 31 and including a pair of axially spaced side flanges 32 and 34 projecting above the surface 31. The cylindrical surface 31 and the flanges 32 and 34 cooperate to keep the tape 20 centered between the flange 32 and 34 as the tape 20 passes partially around the roller guide assembly 28 and as the roller guide itself rotates around its central axis in a manner to be described.

The rim 30 is connected by radially extending webs 35 to a central hub 36 which has an axial bore 38 journaled on a pin 40 which extends into and is captured by recesses 42 and 44 formed in the sidewalls 12 and 14. Clearance is provided between the hub 36 and the pin 40 to permit the roller guide assembly 28 to rotate freely about the pin 40.

The hub 36 extends axially beyond the flange 34 and includes an integral biasing projection 46 which angles from an end surface 48 of the hub 36. The projection 46 may be molded in conjunction with the hub 36 or may be attached to the hub 36 as by adhesive bonding or welding, but is preferably formed by partially slicing or "skiving" the hub 36 in a radial direction so that the hub has a radially extending cut.

Prior to slicing the hub to form the projection 46, the bore 38 is chamferred 52 or counterbored slightly to provide a clearance which ensures that the inner surface of the projection 46 will not interfere with the pin 40 as the projection 46 moves away from the hub 36.

The length of the hub 36 is such that the projection 46 is slightly deflected by the sidewall 12 toward the hub 36 when the sidewalls 12 and 14 are assembled to form the cassette case 10. The natural resiliency of the material comprising the projection 46 produces a biasing force which axially urges the hub 36 into contact with a bearing surface 50 formed in the sidewall 14. This biasing force results in a damping action which restricts axial movement of the roller guide assembly 28. Thus the tape 20 is maintained in desired alignment and noise caused by roller guide oscillation is greatly restricted.

A surprising and beneficial result of using a plastic material to form the roller guide assembly 28 and biasing projection 46 is that the biasing force is reduced to a relatively low value with the passage of time due to a phenomenon known as "creep" or "cold flow". Cold flow is a relaxation of stresses within the material due to molecular rearrangement of the plastic.

The result of this reduction in the biasing force is that the frictional force generated between the roller guide assembly 28 and the cassette case 10 is likewise reduced, and that less torque is required to rotate the roller guide assemblies 28 than would be the case if, for example, a metal helical spring were used as the biasing element.

It will be recognized that the biasing force produced by the projection 46 will be determined and may be varied within limits by selection of the material comprising the hub 36 and also by adjusting the thickness of the projection 46 produced during the slicing operation.

Figure 3:
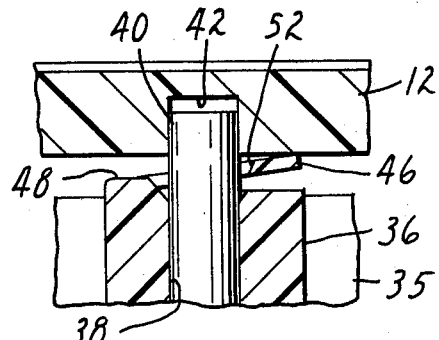
FIG. 3 is an enlarged fragmentary sectional view of the roller guide shown in FIG. 2.

While the present invention has been described with reference to a single embodiment shown in FIGS. 1-3, it will be appreciated by those skilled in the art that many changes can be made in the shapes and features of the roller guide assembly 28 illustrated without departing from the spirit of the invention. For example, the rim 30 and the hub 36 may be formed as a solid piece instead of being connected by the radial webs 35. Furthermore, the axially angled projection 46 need not be located adjacent the pin 40 nor need it be produced on only one end of the hub 36. Biasing projections could be produced by cutting the flanges 32 or 34 at diametrically opposed locations, or could be produced on both ends of the central hub 36. The foregoing detailed description is given for clearness of understanding only and no unnecessary limitation should be understood therefrom.

I claim:

1. In a tape cassette including a pair of generally parallel sidewalls having spaced inner surfaces, the combination with said sidewalls of a roller guide assembly comprising:
   a roller guide having an axis disposed generally normal to said inner surfaces, axially spaced bearing surfaces adjacent said inner surfaces, a main portion comprising a generally cylindrical outer surface about said axis, and at least one axially extending projection integrally formed with said main portion and defined by a partial radially extending cut between said projection and said main portion, said projection defining one of said bearing surfaces and being resiliently deflected toward said main portion by the spacing between the inner surfaces of said sidewalls to locate said roller guide with respect to said inner surfaces; and
   means mounting the guide between said sidewalls for rotation relative thereto around said axis.

2. A tape cassette according to claim 1 wherein said roller guide includes a hub coaxial with said cylindrical outer surface, said hub including said partial radially extending cut between said projection and said main portion.

3. A tape cassette according to claim 1 wherein said means mounting the guide includes a pin having ends each coupled to a different one of said sidewalls and the main portion of said guide further includes a tubular hub journaled on said pin.

4. A tape cassette according to claim 3 wherein said partial radially extending cut is oriented substantially perpendicular to said axis and separates said projection from said hub so that said projection projects angularly away from said hub and partially arcuately surrounds said pin.

5. In a tape cassette including a pair of generally parallel walls having spaced inner surfaces, the combination with said walls of a roller guide assembly comprising:
   a pin having ends coupled to each of said walls and spanning the distance therebetween; and
   a roller guide having an axis disposed normal to said walls, a cylindrical outer surface about said axis, a central hub coaxial with said surface having an axial bore and being journaled on said pin; said hub having a cut oriented perpendicular to said axis to define an arcuate axially extending projection resiliently deflected by the spacing between the inner surfaces of the walls so that said resilient deflection exerts a force locating said guide between said wall.

6. A tape cassette according to claim 5 wherein the bore in said hub is chamfered adjacent said projection to provide clearance between the inner surface of said projection and said pin.

7. A method for biasing a roller guide to a predetermined position between opposed, spaced, parallel sidewalls of a tape cassette, comprising:
   providing a roller guide with a main portion including an axis generally normal to the sidewalls;
   partially slicing the roller guide generally perpendicularly to its axis to produce an arcuate projection projecting axially away from the main portion of the roller guide;
   compressing the projection between the sidewalls so that the projection is deflected toward the main portion to produce a biasing force for locating the roller guide between the sidewalls.

* * * * *